United States Patent
Li et al.

(10) Patent No.: US 9,868,674 B2
(45) Date of Patent: Jan. 16, 2018

(54) CHEMICAL ADDITIVE FOR CALCIUM SULPHOALUMINATE-MODIFIED PORTLAND CEMENT

(71) Applicant: NANJING TECH UNIVERSITY, Nanjing (CN)

(72) Inventors: Weifeng Li, Nanjing (CN); Suhua Ma, Nanjing (CN); Jin Yu, Nanjing (CN); Yueyang Hu, Nanjing (CN); Xiaodong Shen, Nanjing (CN)

(73) Assignee: NANJING TECH UNIVERSITY, Nannjing (CN)

( * ) Notice: Subject to any disclaimer, the term of this patent is extended or adjusted under 35 U.S.C. 154(b) by 0 days.

(21) Appl. No.: 15/301,263

(22) PCT Filed: Sep. 29, 2015

(86) PCT No.: PCT/CN2015/091019
§ 371 (c)(1),
(2) Date: Sep. 30, 2016

(87) PCT Pub. No.: WO2017/045227
PCT Pub. Date: Mar. 23, 2017

(65) Prior Publication Data
US 2017/0267593 A1    Sep. 21, 2017

(30) Foreign Application Priority Data
Sep. 18, 2015    (CN) .......................... 2015 1 0601513

(51) Int. Cl.
| | | |
|---|---|---|
| *C04B 24/14* | (2006.01) |
| *C04B 24/02* | (2006.01) |
| *C04B 24/10* | (2006.01) |
| *C04B 40/00* | (2006.01) |
| *C04B 24/12* | (2006.01) |
| *C04B 28/06* | (2006.01) |
| *C04B 103/22* | (2006.01) |

(52) U.S. Cl.
CPC .......... *C04B 40/0039* (2013.01); *C04B 24/02* (2013.01); *C04B 24/10* (2013.01); *C04B 24/121* (2013.01); *C04B 28/065* (2013.01); *C04B 2103/22* (2013.01)

(58) Field of Classification Search
CPC ... C04B 40/0039; C04B 24/121; C04B 24/10; C04B 24/02; C04B 28/065; C04B 2103/22
See application file for complete search history.

(56) References Cited

FOREIGN PATENT DOCUMENTS

| | | | |
|---|---|---|---|
| CN | 103937628 A | * | 7/2014 |
| CN | 104387940 A | * | 3/2015 |
| WO | WO 2014/088915 A1 | * | 6/2014 |

* cited by examiner

*Primary Examiner* — Anthony J Green
(74) *Attorney, Agent, or Firm* — CBM Patent Consulting, LLC

(57) ABSTRACT

A chemical additive for calcium sulphoaluminate-modified Portland cement comprises the following substances: (a) at least one alkanolamine borate; (b) at least one organic alcohol; and (c) at least one saccharide or a derivative thereof; and the substances and water are sequentially mixed and stirred to obtain the chemical additive for calcium sulphoaluminate-modified Portland cement. The chemical additive for calcium sulphoaluminate-modified Portland cement provided by the invention has better effects of regulating the setting time of the calcium sulphoaluminate-modified Portland cement and improving the 3d/28d strength increase rate, and also has a grinding aid effect when being added during grinding.

4 Claims, No Drawings

CHEMICAL ADDITIVE FOR CALCIUM SULPHOALUMINATE-MODIFIED PORTLAND CEMENT

This application is the U.S. national phase of International Application No. PCT/CN2015/091019 Filed on 29 Sep. 2015 which designated the U.S. and claims priority to Chinese Application Nos. CN201510601513.2 filed on 18 Sep. 2015, the entire contents of each of which are hereby incorporated by reference.

FIELD OF THE INVENTION

The present invention belongs to an additive used in the technical field of cement production, and specifically relates to a chemical additive for improving the performance of calcium sulphoaluminate-modified Portland cement (S.M.P.).

BACKGROUND OF THE INVENTION

A Portland cement clinker containing a little anhydrous calcium sulphoaluminate, a specified mixed material and a proper amount of gypsum are jointly ground into a hydraulic cementing material with early strength and micro-expansibility, referred to as calcium sulphoaluminate-modified Portland cement (S.M.P.), with execution standard JC/T 1099-2009 Calcium Sulphoaluminate-Modified Portland Cement. Chinese patent ZL 03152992.5 and Chinese patent 86103649 both reported a calcium sulphoaluminate-modified Portland cement clinker and a production method thereof. The calcium sulphoaluminate-modified Portland cement (S.M.P.) differs from general Portland cement, has the advantages of high early strength and micro-expansibility by introducing an anhydrous calcium sulphoaluminate mineral with the characteristics of early strength, rapid hardening and micro-expansibility in the mineral composition, and however has the disadvantages that the setting time is too short and difficult to control, the 3d/28d strength increase rate is low and the like.

$SO_3$ participating in hydration reaction in S.M.P. mainly comes from gypsum and $C_4A_3S$. If appropriate gypsum is added, not only can the setting time and the micro-expansibility be improved, but also the early strength can be improved, air shrinkage can be reduced, and the corrosion resistance, freezing resistance, impermeability and the like can be improved. However, if excessive gypsum is added, not only is the retarding effect poor, but also ettringite is easily further formed later to produce expansion stress to reduce the cement strength and, in serious cases, even cause poor soundness. Researches show that in order to ensure qualified soundness of S.M.P., the content of $SO_3$ must be controlled to be less than or equal to 6%, and the initial setting time of the S.M.P. at the moment only reaches about 30 min, so the application requirements are difficult to meet. After a certain amount of mixed material, such as slag and fly ash, is added, the setting time can be prolonged, and the initial setting time can be prolonged to about 60 min (adding 30% of fly ash or 30% of slag). (Liu Chen, Wang Xin, Yan Bilan, et al., JC/T Calcium Sulphoaluminate-Modified Portland Cement Industry Standards Introduction [J], cement, 2009, 08:61-64). Thus, in order to meet the technical requirements of application of the S.M.P. for setting time, strength increase and the like, proper technical measures must be adopted to improve the performance of the S.M.P.

SUMMARY OF THE INVENTION

In view of this, the technical problem to be solved by the present invention is to provide a chemical additive for improving the performance of calcium sulphoaluminate-modified Portland cement (S.M.P.). The chemical additive for the calcium sulphoaluminate-modified Portland cement has better effects of regulating the setting time and improving the 3d/28 strength increase rate.

To solve the above technical problem, the present invention adopts the following technical solutions:

A chemical additive for calcium sulphoaluminate-modified Portland cement includes the following substances:
(a) at least one alkanolamine borate;
(b) at least one organic alcohol; and
(c) at least one saccharide or a derivative thereof;
wherein the substances and water are sequentially mixed and stirred to obtain the chemical additive for calcium sulphoaluminate-modified Portland cement.

The mixing sequence of the above substances and water is not limited to a, b and c, as long as the second raw material is added after one raw material is added.

The mass ratio of the alkanolamine borate, the organic alcohol, the saccharide or the derivative thereof and the water is (15-60): (3-30): (3-25): (15-60). The mass ratio is preferably (25-50): (5-25): (3-20): (20-60).

The alkanolamine borate is diethanolisopropanolamine (DEIPA) borate, N,N-di(2-hydroxypropyl)-N-(hydroxyethyl) amine (EDIPA) borate or triisopropanolamine (TIPA) borate.

The organic alcohol is ethylene glycol, diethylene glycol, propylene glycol or glycerin.

The saccharide or the derivative thereof is saccharose, glucose, fructose, high fructose corn syrup or cane molasses or a salt of the saccharose, glucose or fructose.

The above chemical additive is used in calcium sulphoaluminate-modified Portland cement.

The adding quantity of the chemical additive is 0.05-0.15% of the weight of calcium sulphoaluminate-modified Portland cement.

It can be seen from the above technical solutions that the present invention provides a chemical additive for calcium sulphoaluminate-modified Portland cement, including the following substances added into the calcium sulphoaluminate-modified Portland cement, preferably added in the grinding process: (a) at least one alkanolamine borate; (b) at least one organic alcohol; and (c) at least one saccharide or a derivative thereof. The raw materials and water are sequentially mixed and stirred to obtain the chemical additive for calcium sulphoaluminate-modified Portland cement. The chemical additive for calcium sulphoaluminate-modified Portland cement provided by the present invention is simple in preparation and low in consumption, has better effects of regulating the setting time of the calcium sulphoaluminate-modified Portland cement and improving the 3d/28d strength increase rate, and also has a grinding aid effect when being added during grinding.

Most of the existing technologies are directed to the traditional Portland cement, are used for improving early strength and prolonging setting time and the like of the cement after a mixed material is added to the Portland cement, and with traditional cement chemical additive components such as triethanolamine, glycerin and the like as main components, the requirements of use in calcium sulphoaluminate-modified Portland cement (S.M.P.) is difficult to meet. Compared with the prior art, the present invention has (a) at least one alkanolamine borate, (b) at least one organic alcohol, (c) at least one saccharide or a derivative thereof and water sequentially mixed and stirred to obtain a chemical additive for calcium sulphoaluminate-modified Portland cement, and this has never been reported. Experimental results show that when the adding quantity of the chemical additive for calcium sulphoaluminate-modified Portland cement prepared in the present invention in the calcium sulphoaluminate-modified Portland cement is 0.15%, the initial setting time and the final setting time of the cement are respectively prolonged 25 min and 38 min relative to a reference sample, and the 3d and 28d compressive strengths are respectively increased 1.6 Mpa and 7.8 Mpa relative to the reference sample.

DETAILED DESCRIPTION OF THE EMBODIMENTS

A clear and complete description of the technical solutions in the embodiments of the present invention will be given below. Apparently, the described embodiments are merely a part, but not all, of the embodiments of the present invention. The present invention can be better understood according to the following embodiments. However, those skilled in the art could easily understand that the specific material proportions, process conditions and results described in the embodiments are merely used for illustrating the present invention, rather than limiting the present invention described in detail in the claims. All of other embodiments, obtained by those of ordinary skill in the art based on the embodiments of the present invention without any inventive effort, fall into the protection scope of the present invention.

The present invention discloses a chemical additive for calcium sulphoaluminate-modified Portland cement, including the following substances added into the calcium sulphoaluminate-modified Portland cement (preferably the prepared chemical additive is added in the grinding process of the calcium sulphoaluminate-modified Portland cement): (a) at least one alkanolamine borate; (b) at least one organic alcohol; and (c) at least one saccharide or a derivative thereof. The raw materials and water are sequentially mixed and stirred to obtain the chemical additive for calcium sulphoaluminate-modified Portland cement. The chemical additive for calcium sulphoaluminate-modified Portland cement is simple in preparation and low in consumption, has better effects of regulating the setting time of the calcium sulphoaluminate-modified Portland cement and improving the 3d/28d strength increase rate, and also has a grinding aid effect when being added during grinding.

According to the present invention, the mass ratio of the alkanolamine borate, the organic alcohol, the saccharide or the derivative thereof and the water is (15-60): (3-30): (3-25): (15-60), more preferably (25-50): (5-25): (3-20): (20-60).

According to the present invention, the alkanolamine borate is any one of or a mixture of several of diethanolisopropanolamine (DEIPA) borate, N,N-di(2-hydroxypropyl)-N-(hydroxyethyl) amine (EDIPA) borate and triisopropanolamine (TIPA) borate. Boracic acid is an effective retarder of the calcium sulphoaluminate-modified Portland cement, but due to its low dissolubility, its dispersion and effect in cement mortar are limited, and thus its retarding effect for the calcium sulphoaluminate-modified Portland cement is influenced. The alkanolamine can reduce the surface energy of material particles, reduce particle aggregation and improve the grinding efficiency; the alkanolamine such as DEIPA, EDIPA, TIPA and the like is a known cement quality improver, can effectively improve the 28d and far age strength of the Portland cement, and is also beneficial to improving the 28d strength of the calcium sulphoaluminate-modified Portland cement. By adding the borate formed by esterification of the boracic acid and the alkanolamine into the calcium sulphoaluminate-modified Portland cement as an additive in the present invention, on the one hand effective dispersion of the alkanolamine borate in cement mortar is achieved, and on the other hand the borate is quickly hydrolyzed into boracic acid and alkanolamine in the alkaline mortar after water is added to cement, thereby realizing retardation and performance improvement of the calcium sulphoaluminate-modified Portland cement.

According to the present invention, the organic alcohol is one of or a mixture of several of ethylene glycol, diethylene glycol, propylene glycol and glycerin. The applicant discovers in studies that the organic alcohol is beneficial to improving the retarding effect of the boracic acid on the calcium sulphoaluminate-modified Portland cement.

According to the present invention, the saccharide or the derivative thereof is at least one of or a mixture of several of saccharose, glucose, fructose, high fructose corn syrup, cane molasses and a salt of the above-mentioned saccharide. The saccharide and the derivative thereof are conventional retarding components of the Portland cement. The applicant discovers in studies that the saccharide and the derivative thereof are also beneficial to improving the retarding effect of the boracic acid on the calcium sulphoaluminate-modified Portland cement.

The chemical additive for calcium sulphoaluminate-modified Portland cement prepared in the present invention is suitable for improving the setting time and the strength performance, particularly the 28d strength of the cement, and does not have negative influence on cement and concrete.

In order to further illustrate the technical solutions of the present invention, preferred implementations of the present invention will be described below in combination with the embodiments. However, it should be understood that these descriptions are merely used for further illustrating the features and the advantages of the present invention, rather than limiting the claims of the present invention.

Comparative Example 1

Calcium sulphoaluminate-modified Portland cement clinker is selected from Inner Mongolia JS Special Cement Co., Ltd., and dihydrate gypsum is selected from Nanjing ZL Cement Co., Ltd. The calcium sulphoaluminate-modified Portland cement clinker is pre-dried, 4 kg of materials (3.64 kg of the calcium sulphoaluminate-modified Portland cement clinker and 0.36 kg of the dihydrate gypsum) are weighed and ground in a 500 mm*500 mm standard laboratory grinder, various physical properties of the ground cement materials are tested by using a detection method with reference to JC/T 1099-2009 Calcium Sulphoaluminate-Modified Portland Cement.

Embodiment 1

50 weight parts of diethanolisopropanolamine (DEIPA) borate, 15 weight parts of ethylene glycol, 10 weight parts of glycerin and 5 weight parts of sodium gluconate are successively added into 20 weight parts of water, and the mixture is stirred to obtain a chemical additive A.

According to the method of comparative example 1, 0.05 wt % of the chemical additive prepared in this embodiment is added to the materials for grinding in the laboratory grinder, and the measurement results of the ground materials are shown in table 1.

Embodiment 2

35 weight parts of N,N-di(2-hydroxypropyl)-N-(hydroxyethyl) amine (EDIPA) borate, 12.5 weight parts of diethylene glycol, 10 weight parts of propylene glycol, 5 weight parts of saccharose and 5 weight parts of sodium gluconate are successively added into 32.5 weight parts of water, and the mixture is stirred to obtain a chemical additive B.

According to the method of comparative example 1, 0.1 wt % of the chemical additive prepared in this embodiment is added to the materials for grinding in the laboratory grinder, and the measurement results of the ground materials are shown in table 1.

TABLE 1

| | Sieve residue/% | | Standard consistency water consumption/% | Setting time/h:min | | Compressive strength/Mpa | | |
|---|---|---|---|---|---|---|---|---|
| | 80 | 45 μm | | Initial setting | Final setting | 1 d | 3 d | 28 d |
| Comparative example 1 | 2.4 | 14.6 | 26.1% | 0:24 | 0:45 | 25.2 | 37.2 | 48.9 |
| Embodiment 1 | 1.8 | 10.2 | 25.9% | 0:45 | 1:26 | 25.6 | 39.8 | 54.3 |
| Embodiment 2 | 1.2 | 9.8 | 26.1% | 0:39 | 1:12 | 25.3 | 38.6 | 55.6 |

Embodiment 3

15 weight parts of diethanolisopropanolamine (DEIPA) borate, 10 weight parts of N,N-di(2-hydroxypropyl)-N-(hydroxyethyl) amine (EDIPA) borate, 5 weight parts of glycerin and 15 weight parts of high fructose corn syrup (the solid content is 50%, and the ratio of fructose to glucose is 1:1) are successively added into 55 weight parts of water, and the mixture is stirred to obtain a chemical additive C.

The cement sample in comparative example 1 is selected, 0.15 wt % of the chemical additive C is added to the molded cement, then various physical properties are tested by using a detection method with reference to JC/T 1099-2009 Calcium Sulphoaluminate-Modified Portland Cement, and the measurement results are shown in table 2.

Embodiment 4

18 weight parts of diethanolisopropanolamine (DEIPA) borate, 10 weight parts of N,N-di(2-hydroxypropyl)-N-(hydroxyethyl) amine (EDIPA) borate, 10 weight parts of triisopropanolamine borate, 10 weight parts of ethylene glycol, 8 weight parts of sodium gluconate and 4 weight parts of fructose are successively added into 40 weight parts of water, and the mixture is stirred to obtain a chemical additive D.

The cement sample in comparative example 1 is selected, 0.10 wt % of the chemical additive D is added to the molded cement, then various physical properties are tested by using a detection method with reference to JC/T 1099-2009 Calcium Sulphoaluminate-Modified Portland Cement, and the measurement results are shown in table 2.

TABLE 2

| | Standard consistency water consumption/% | Setting time/h:min | | Compressive strength/Mpa | | |
|---|---|---|---|---|---|---|
| | | Initial setting | Final setting | 1 d | 3 d | 28 d |
| Comparative example 1 | 26.1% | 0:24 | 0:45 | 25.2 | 37.2 | 48.9 |
| Embodiment 3 | 25.8% | 0:49 | 1:23 | 23.6 | 38.8 | 56.7 |
| Embodiment 4 | 26.0% | 0:52 | 1:18 | 23.0 | 38.1 | 54.8 |

It can be seen from the above embodiments and the comparative example that the chemical additive for calcium sulphoaluminate-modified Portland cement provided by the present invention has better effects of regulating the setting time of the calcium sulphoaluminate-modified Portland cement and improving the 3d/28d strength increase rate, and also has a grinding aid effect when being added during grinding.

The above description of the disclosed embodiments enables those skilled in the art to implement or use the present invention. Multiple modifications made to these embodiments would be obvious for those skilled in the art, and what is defined in the present invention generally can be achieved in other embodiments without departing from the spirit or scope of the present invention. Hence, the present invention would not be limited to these embodiments described herein, but conforms to the broadest scope consistent with the principle and the novelty of the disclosure herein.

What is claimed is:

1. A chemical additive for calcium sulphoaluminate-modified Portland cement comprises alkanolamine borate, organic alcohol, saccharide or its derivative, and water, wherein the mass ratio of the alkanolamine borate, the organic alcohol, the saccharide or the derivative and the water is (15-60): (3-30): (3-25): (15-60);

wherein the alkanolamine borate is one or more compounds selected from a group consisting of diethanolisopropanolamine borate, N,N-di(2-hydroxypropyl)-N-(hydroxyethyl) amine borate and triisopropanolamine borate; the organic alcohol is one or more compounds selected from a group consisting of ethylene glycol, diethylene glycol, propylene glycol and glycerin; and the saccharide or the derivative is one or more compounds selected from a group consisting of saccharose, glucose, fructose, high fructose corn syrup, cane molasses and a salt of the above mentioned saccharide.

2. The chemical additive for calcium sulphoaluminate-modified Portland cement of claim 1, wherein the mass ratio of the alkanolamine borate, the organic alcohol, the saccharide or the derivative and the water is (25-50): (5-25): (3-20): (20-60).

3. A process for using the chemical additive of claim 1 in calcium sulphoaluminate-modified Portland cement by adding the chemical additive into a molded cement.

4. The process of claim 3, wherein adding quantity of the chemical additive is 0.05-0.15% of the calcium sulphoaluminate-modified Portland cement by weight.

* * * * *